(12) United States Patent
Bortman et al.

(10) Patent No.: US 10,944,996 B2
(45) Date of Patent: Mar. 9, 2021

(54) VISUAL QUALITY OPTIMIZED VIDEO COMPRESSION

(71) Applicant: Intel Corporation, Santa Clara, CA (US)

(72) Inventors: Maria Bortman, Askelon (IL); Tzach Ashkenazi, Petach Tikva (IL); Ilya Romm, Bat-Yam (IL); Gaby Prechner, Beer Yaakov (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/544,557

(22) Filed: Aug. 19, 2019

(65) Prior Publication Data

US 2019/0373293 A1    Dec. 5, 2019

(51) Int. Cl.
*H04N 19/86* (2014.01)
*H04N 19/176* (2014.01)
*H04N 19/30* (2014.01)

(52) U.S. Cl.
CPC .......... *H04N 19/86* (2014.11); *H04N 19/176* (2014.11); *H04N 19/30* (2014.11)

(58) Field of Classification Search
CPC .... G06T 3/4046; H04N 19/132; H04N 19/17; H04N 19/176; H04N 19/30; H04N 19/59; H04N 19/86
See application file for complete search history.

(56) References Cited

U.S. PATENT DOCUMENTS

| | | | | |
|---|---|---|---|---|
| 2019/0130278 A1* | 5/2019 | Karras | .................. | G06N 3/0454 |
| 2019/0287217 A1* | 9/2019 | Cooke | .................. | G06N 3/0454 |
| 2020/0059669 A1* | 2/2020 | Nishi | .................. | H04N 19/192 |

OTHER PUBLICATIONS

Agustsson et al. "Generative Adversarial Networks for Extreme Learned Image Compression" https://arxiv.org/pdf/1804.02958v2.pdf Oct. 23, 2018. (Year: 2018).*

Blau, et al., "The perception-distortion tradeoff", Proceedings of the IEEE Conference on Computer Vision and Pattern Recognition, 2018.

Wang, et al., "Super-Resolution with GAN", retrieved online via http://cs230.stanford.edu/files_winter_2018/projects/6937784.pdf, (2018).

Search Report for European Patent Application No. 20182241.8, dated Dec. 9, 2020.

Ekmekcioglu, E. et al., "Low-delay random view access in multi-view coding using a bit-rate adaptive downsampling approach", 2008 IEEE International Conference on Multimedia and Expo, Jun. 23, 2008, pp. 745-748.

Hamis, S. et al., "Image Compression at Very Low Bitrate Based on Deep Learned Super-Resolution", 2019 IEEE 23rd International Symposium on Consumer Technologies (ISCT), Jun. 19, 2019, pp. 128-133.

* cited by examiner

*Primary Examiner* — Farzana Hossain
(74) *Attorney, Agent, or Firm* — Green, Howard & Mughal LLP.

(57) ABSTRACT

Techniques related to providing high perceptual quality video from highly compressed and decompressed reconstructed video are discussed. Such techniques include applying a pretrained decompression upsampling portion of a generative adversarial network to the decompressed reconstructed video to upsample and improve the perceptual quality of the decompressed reconstructed video to generate output video.

21 Claims, 10 Drawing Sheets

VISUAL QUALITY OPTIMIZED VIDEO COMPRESSION

BACKGROUND

In various contexts, such as for sporting events or other high profile events, multiple (e.g., 38) cameras are installed in view of the scene (e.g., around a stadium). Simultaneous or contemporaneous video of the scene is captured and a point cloud is built to create a volumetric model of the scene. The point cloud is then painted with the captured texture from multiple captured pictures of the scene in every moment such that a photo realistic 3D model of the scene is generated. Furthermore, a virtual camera or view within the 3D model may then be used to navigate in this 3D space and render an observed view to offer multiple degree of freedom for a highly immersive user experience.

Creating real-time volumetric video of the event in such contexts requires very high computational power and requires that almost the entire process, as discussed above, be performed in a cloud computing environment or similar environment. For example, current throughput in terms of data being transferred to the cloud for processing may be about 440 Gb/s while future systems are expected to reach up to 15 Tb/s of necessary throughput. Typically, such data needs to be transmitted to the cloud or other compute environment in a pipe with maximal bandwidth of about 10 Gb/s, so for future systems a compression ratio of around 1/3000 may be needed. Furthermore, final system output (e.g., the 3D model) needs to have very high quality to maintain the immersive user experience.

It is with respect to these and other considerations that the present improvements have been needed. Such improvements may become critical as the desire to provide immersive user experiences in scenes attained by multiple cameras becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
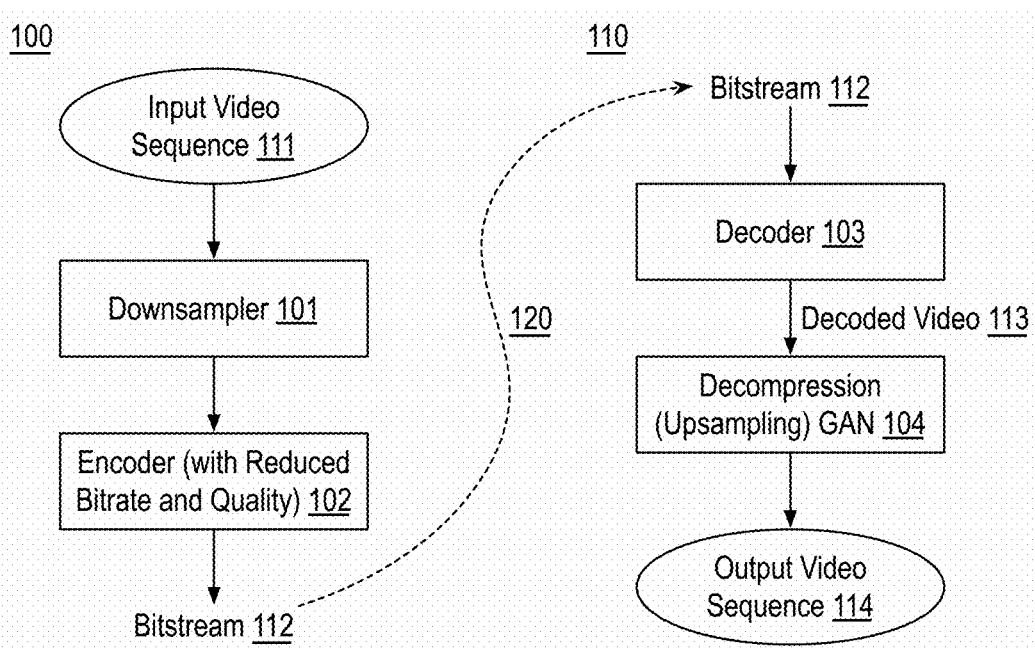
FIG. 1 illustrates exemplary systems for providing video compression and decompression coupled by a communications interface.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to visual quality optimized video compression.

As described above, it may be necessary, in the context of 3D modeling from data attained from multiple cameras trained on a scene and other contexts, to provide very high video compression ratios as the ratio of rate of input data to available transfer bandwidth is extremely high. Also as discussed, the final system output (e.g., a 3D model) needs to have very high quality to maintain the immersive user experience. Therefore, it is necessary that, after encode/decode, the decoded picture remains faithful to the source picture. However, it is not necessary that the decoded picture matches the input picture by measuring pixel-based metrics like sum of square distances (SSD) or structural similarity (SSIM) but by perceptual quality estimation. As used herein, the term improved perceptual quality or similar terms indicate that a picture has improved perceptual quality or perceptual quality estimation relative to another picture. As used herein, the term perceptual quality estimation and other similar terms indicate a perceived image quality that does not match or reference a pixel wise similarity in whole or in part to a particular reference image. An example of the difference between perceptual quality estimation and pixel wise picture similarity is that an image portion including grass needs to have a texture that will be captured or perceived as real by a viewer (after encode, decode, and reconstruction) but the texture does not have to faithfully recreate, by pixel wise measurement, the texture of the source picture (e.g., the reconstructed picture does not need to match the source picture, but it must have high perceptual quality to pass as a possible source picture). Improvements to perceptual quality include but are not limited to applying or refining texture, improving sharpness, and removing or mitigating artifacts such as ringing or blockiness. Furthermore, it has been shown that optimizing any such pixel-based metrics creates a pixel with lower perceptual quality and a perfect solution that satisfies both perceptual and pixel wise (e.g., distortion) measures is impossible (please refer to The Perception-Distortion Tradeoff, Yochai Blau, Tomer Michaeli, The IEEE Conference on Computer Vision and Pattern Recognition (CVPR), 2018, pp. 6228-6237).

Another limitation in the context of transferring large amounts of data for a high number of video streams (at high resolution such as 4 k) is the number of encoders deployed at the venue (e.g., the location where the cameras are installed). For example, in contexts where there are hardware limitations due to cost, placement, power concerns, etc., the number and size of available encoders may become a bottleneck.

In some embodiments, video pictures (or frames) are attained from a number of cameras trained on the scene such that each camera attains a video sequence of video pictures that are contemporaneous. It is noted that the terms picture, frame, and image are used interchangeably herein. The video pictures are then resized (downsampled) at the system at or near the scene such that encode of the downsampled video pictures will require fewer encoders and reduce the bitrate of the encoded video. The downsampled video sequences are then encoded using a standard encoder such as an H.264 or an H.265 encoder to generate a bitstream for each sequence. Notably, since the video sequences are downsampled, each available encoder (e.g., hardware encoder) may handle multiple video sequences simultaneously. For example, for downsampled 4 k video, the downsample video pictures may be arranged such that each picture for encode includes multiple video pictures from multiple scenes and an encoder may then encode multiple video sequences simultaneously. For example, for video downsampled by 4 in each dimension, each picture for encode may include 16 video pictures from 16 video streams. Furthermore, the discussed encode may be performed at a low bitrate such that the resultant bitstreams have low bitrate with respect to the original video resolution attained at each camera.

The resultant bitstreams are then transmitted to a remote processing location such as a cloud computing environment or a similar system for processing. Such processing commences with decode of the bitstreams to generated reconstructed video pictures and sequences in accordance with the codec (e.g., H.264 or H.265) used to generate the bitstreams. Notably, the reconstructed video pictures and sequences include artifacts such as blockiness, image portions that lack texture (which was lost in compression/decompression), blurriness due to poor motion tracking, and so on. Such poor video picture and sequence quality results from the downsampling and low bitrate coding performed at the scene and may be necessitated by the need for transmission of a large number of video sequences, often in real time or near real time, for processing to generate, for example, 3D models of the scene.

At the cloud computing side, a pretrained decompression portion of a generative adversarial network (GAN) is applied to some or all of the video pictures to upsample the video pictures and improve the perceptual quality of the video pictures to generate output video pictures that are at a better quality and with greater resolution than the decoded video pictures. The upsampled video resolution output from the pretrained decompression upsampling portion of a generative adversarial network may be the same as the original video captured at the scene (e.g., 4 k) or it may be lower. In either case, the output video pictures are at a resolution that allows 3D model generation and include improved perceptual quality. As discussed, such improved perceptual quality does not necessarily match or reference a pixel wise similarity in whole or in part to the corresponding reference picture. Notably, perceptual picture quality may lack a formal definition but can be measured using image quality assessment (IQA) techniques that may assess images using subjective methods based on perceptual assessment of a human or objective methods based on computational methods predictive of image quality. As used herein, improved perceptual picture quality indicates texture or other features have been added to a picture. In an embodiment, such added texture may be measured relative to an input picture based on pixel based measurements of one or more collocated regions of the input and output pictures. For example, the output picture region may have increased pixel variance, increased pixel range, increased edge counts, or the like with respect to the collocated region of the input picture.

As used herein, the term pretrained decompression upsampling portion of a generative adversarial network indicates a convolutional neural network that was trained in a generative adversarial network architecture. Notably, other components of the generative adversarial network, such as a discrimination network, may be discarded during an implementation phase of the pretrained decompression upsampling portion. In some embodiments, the pretrained decompression upsampling portion and the discrimination network are trained together to train the pretrained decompression upsampling portion (also called a decompression network or decompression GAN herein) to generate output pictures that emulate real life pictures from a training set and to train the discrimination network to identify real pictures (i.e., those from the training set) versus fake pictures (i.e., those from the decompression network).

The video pictures and sequences (i.e., multiple sequences of upsampled video pictures) from the implemented decompression network may then be used in a variety of contexts such as 3D model generation. For example, the 3D model generation may include object detection, image segmentation, 3D point cloud reconstruction, and point cloud rendering to add texture. The rendered 3D model may then be used to generate a virtual image from any point within the scene represented by the 3D model. Although discussed herein with respect to 3D model generation, the video pictures and sequences may be used in any context such as display to a user.

FIG. 1 illustrates exemplary systems 100, 110 for providing video compression and decompression coupled by a communications interface 120, arranged in accordance with at least some implementations of the present disclosure. As shown in FIG. 1, system 100 includes a downsampler 101 and an encoder 102 (to perform encode with reduced bitrate and quality). Furthermore, system 110 includes a decoder 103 and a decompression GAN 104. Decompression GAN 104 may be characterized as a decompression network, a pretrained decompression upsampling portion of a GAN, or the like. In any event, a pretrained decompression upsampling portion or decompression GAN implements a convolutional neural network to upsample and apply texture to an input picture by implementing an architecture and pretrained parameters that were selected and trained in a GAN environment as is discussed further herein.

Systems 100, 110 are implemented separately and either or both may be implemented in any suitable device or grouping of devices. In some embodiments, system 100, system 110, or both are implemented via a server computer, a cloud computing environment, personal computer, a laptop computer, a tablet, a phablet, a smart phone, a gaming console, a wearable device, a display device, an all-in-one device, a two-in-one device, or the like. In some embodiments, systems 100, 110 are implemented via a combination of such devices. In particular, systems 100, 110, and in particular, system 110 may be implemented among several devices for the sake of improved performance such as computational speed. For example, system 110 may implement a pretrained decompression upsampling portion of a generative adversarial network to upsample and apply texture to a low resolution input video picture as discussed herein. In some embodiments, system 100 may include or be implemented with multiple cameras used to attain images of a scene. Furthermore, such views may be used to build a volumetric model such as a point cloud, a 3D model, or similar data structure of the scene. For example, the components of system 100 may be incorporated into a multi-camera multi-processor system to deliver bitstreams representative of attained video and system 100 may be incorporated into a multi-processor system to generate an immersive visual experience for viewers of the scene. In some embodiments, system 100 is hardware or compute resource limited since it is implemented at a scene while system 110 is not so limited as it is implemented in a remote cloud computing environment. In some embodiments, systems 100, 110 utilize modern GAN architectures to compress video in a manner that preserves visual quality (while not necessarily matching a reference picture in a pixel wise manner).

Figure 2:
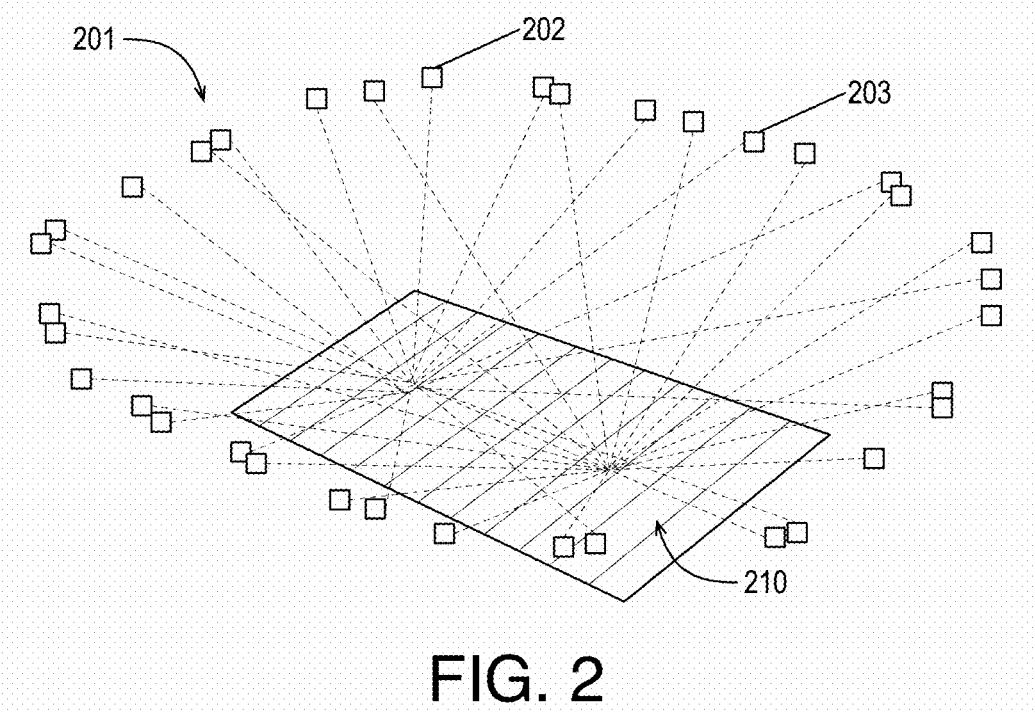
FIG. 2 illustrates an example camera array trained on an example scene.

FIG. 2 illustrates an example camera array 201 trained on an example scene 210, arranged in accordance with at least some implementations of the present disclosure. In the illustrated embodiment, camera array 201 includes 36 cameras trained on a sporting field. However, camera array 201 may include any suitable number of cameras trained on scene 210 such as not less than 20 cameras. In some embodiments, single camera implementations may also be used. For example, camera array 201 may be trained on scene 210 to attain contemporaneous video pictures and sequences of scene 210 for eventual generation of a 3D model of scene 210 and fewer cameras may not provide adequate information to generate the 3D model. Camera array 201 may be mounted to a stadium (not shown) surrounding the sporting field of scene 210, calibrated, and trained on scene 210 to capture contemporaneous or simultaneous images or video. As shown, each camera of camera array 201 has a particular view of scene 210. For example, camera 202 has a first view of scene 210 and camera 203 has a second view of scene 210 and so on. As used herein, the term view indicates the image content of an image plane of a particular camera of camera array 201 or image content of any view from a virtual camera located within scene 210. Notably, the view may be a captured view (e.g., a view attained using image capture at a camera) such that multiple views include representations of the same person, object, entity, etc.

Returning to FIG. 1, as shown, an input video sequence 111 may be provided to downsampler 101. Input video sequence 111 may be attained from any camera of camera array 201 or any other source. For example, although discussed herein with respect to processing video attained from camera array 201, any video source may be used. Input video sequence 111 may include any picture data, video frame data, image data, or the like or any data structure representative of a picture at any suitable resolution. In an embodiment, input video sequence 111 has a 5 k resolution (e.g., a horizontal resolution of around 5,000 pixels such as 5120×3072 pixel resolution). In some embodiments, input video sequence 111 has a resolution of not less than 4 k (e.g., a horizontal resolution of around 4,000 pixels and not less than 3840 pixels such as 3840×2160 pixel resolution or 4096×2160 pixel resolution). However, any suitable resolution of input video may be implemented.

Downsampler 101 downsamples pictures of input video sequence 111 or at least portions thereof using any suitable technique or techniques. In an embodiment, each high resolution picture (or portions thereof) are significantly downsampled to be encoded with a limited number of encoders. For example, to encode with one H.264 encoder (as implanted by encoder 102) a downsample factor of ⅛ in both axis or direction (i.e., horizontal and vertical) may be applied to 4 k video such that the resultant downsampled picture is 64 times less than original. The downsample factor may be any suitable factor such as 8 in each direction as discussed or 4 in each direction. In an embodiment, a resolution of input video sequence 111 is not less than eight times a resolution of the downsampled video in both the vertical and horizontal directions. In some embodiments, due to the large down-sample factors and to allow better eventual decompression by system 110, an anti-aliasing filter is applied to each picture of input video sequence 111 prior to downsampling.

As is discussed further herein below, in some embodiments, pictures of input video sequence 111 are separated or segmented into different regions such that region dependent downsampling, encode, and/or decompression GANs, are applied based on region. For example, with respect to downsampler 101, an input picture may be separated into foreground and background or by detected object type (e.g., person, grass, crowd, etc.) and different downsampling may be applied depending on the region type. In an embodiment, foreground regions are downsampled at a lower rate (e.g., downsampled less) or not at all while background regions are downsampled at a higher rate (e.g., downsampled more). In an embodiment, regions having a person are downsampled at a lower rate or not at all while crowd and grass regions are downsampled at a higher rate. In an embodiment, regions of interest (e.g., regions having a person, ball, or other object of interest) are downsampled at a lower rate or not at all while other regions (e.g., background regions) are downsampled at a higher rate.

As shown, the resultant downsampled video sequence is provided to encoder 102, which encodes each downsampled video sequence into a bitstream 112. Encoder 102 may encode each downsampled video sequence using any suitable technique or techniques such as codec compliant (e.g., H.264, H.265, etc.) encode to generate a standards compliant bitstream 112 for each downsampled video sequence. As discussed, the encode performed by encoder 102 may be a reduced bitrate and quality encode such that bitstream 112 has a low resultant bitrate. In an embodiment, the downsampled video sequence is 480p video (e.g., 720×480=345, 600 pixels) and the bitrate is not more than 0.5 megabits per second. Such low bitrate encode may reduce the burden on communications interface 120. In an embodiment, a ratio of bitrate to the video resolution does not exceed a threshold amount. In the above described 480p and 0.5 megabits per second example, the ratio is 500,000/345,600=1.44 (in bits/second per pixel). In an embodiment, the bitrate to video resolution ratio does not exceed 1.5. In an embodiment, the bitrate to video resolution ratio does not exceed 1.75. In an embodiment, the bitrate to video resolution ratio does not exceed 2.0. In another example, the downsampled video sequence is 720p (e.g., 1280×720) and the bitrate is not more than 1.5 megabits per second.

As discussed, in some embodiments, pictures of input video sequence 111 (or the resultant downsampled video) are separated or segmented into different regions such that region dependent encode is applied based on region. For example, with respect to encoder 102, an input picture may be separated into foreground and background or by detected object type (e.g., person, grass, crowd, etc.) and different encode bitrate or other parameters may be applied depending on the region type. In an embodiment, foreground regions are encoded at a higher bitrate while background regions are encoded at a lower bitrate. In an embodiment, regions having a person are encoded at a higher bitrate while crowd and grass regions are encoded at a lower bitrate. In an embodiment, regions of interest (e.g., regions having a person, ball, or other object of interest) are encoded at a higher bitrate while other regions (e.g., background regions) are encoded at a lower bitrate.

As shown, compressed bitstreams 112 are transmitted by system 100 over communications interface 120 to system 110. Communications interface 120 may be any suitable communications interface, network, etc. that allows transmission of data between systems 100, 110. As discussed, system 110 may be implemented via a cloud computing environment or system.

System 110 receives bitstreams 112 and decoder 103 of system 110 decodes each of bitstreams 112 into reconstructed video pictures and sequences. Decoder 103 decodes bitstreams 112 using techniques analogous to those implemented by encoder 102. Notably, decoder 103 may decode standards compliant bitstreams 112 based on any of such standards (e.g., H.264, H.265, etc.). That is, decoder 103 receives compressed bitstreams 112 (e.g., the output of encoder 102) and generated reconstructed or decoded video 113, which may contain significant artifacts due to the downsampling and low quality encode performed by system 100.

Figure 3:
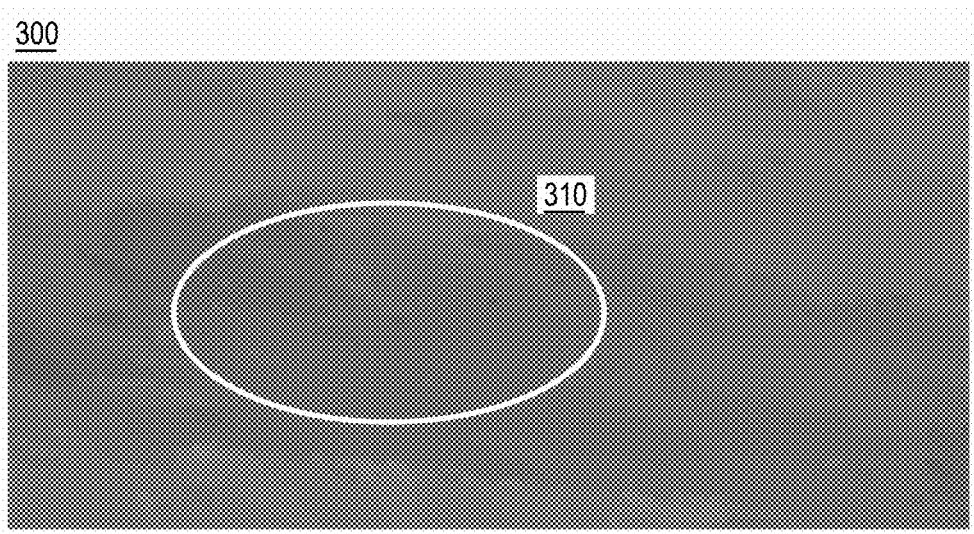
FIG. 3 illustrates a portion of an example decoded video picture including an artifact region.

FIG. 3 illustrates a portion of an example decoded video picture 300 including artifact region 310, arranged in accordance with at least some implementations of the present disclosure. In FIG. 3, decoded video picture 300 is representative of a portion of a scene including grass (e.g., a soccer field). As shown with respect to artifact region 310, decoded video picture 300 is blocky, cartoonish, and fails to depict a naturally grassy surface. Therefore, decoded video picture 300 has low perceptual quality.

Figure 4:
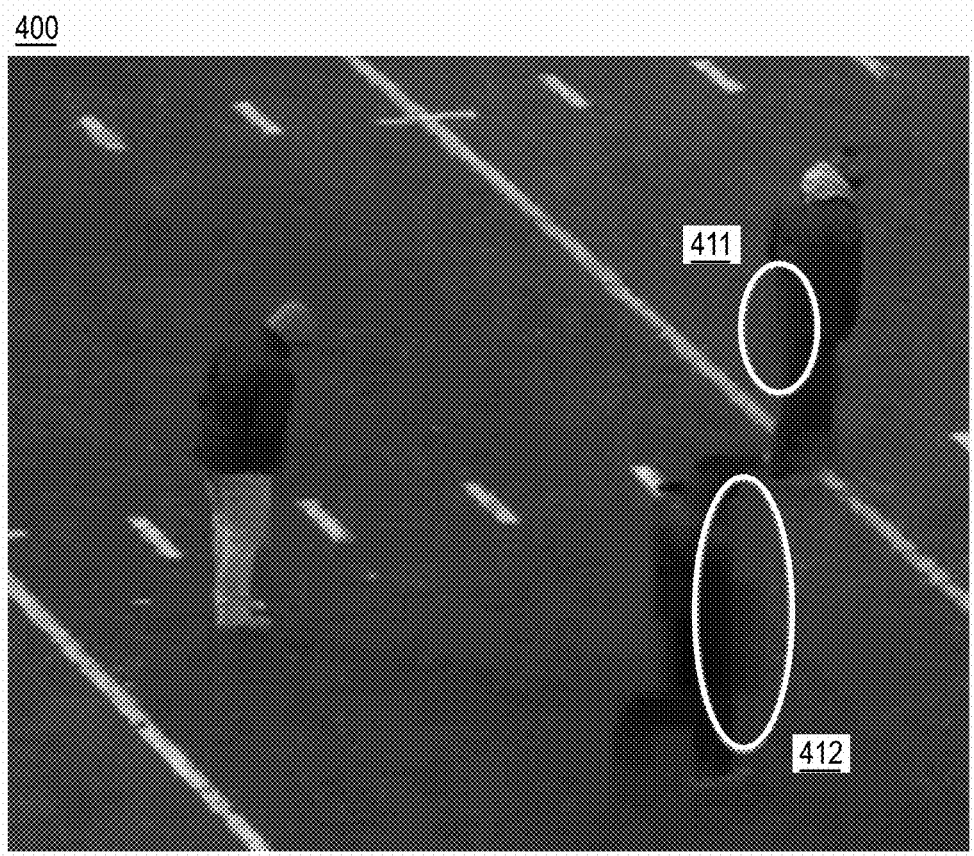
FIG. 4 illustrates a portion of an example decoded video picture including artifact regions.

FIG. 4 illustrates a portion of an example decoded video picture 400 including artifact regions 411, 412, arranged in accordance with at least some implementations of the present disclosure. In FIG. 4, decoded video picture 400 is representative of a portion of a scene including people walking across a football field. As shown with respect to artifact regions 411, 412, decoded video picture 400 includes blur artifacts due to poor motion tracking (e.g., at low bitrate). Therefore, decoded video picture 400 has low perceptual quality.

Returning to FIG. 1, decoded video 113 is provided to decompression GAN 104. Decompression GAN 104 processes pictures of decoded video 113 to upsample each picture and to selectively apply texture, modify, refine, and improve the perceptual quality of pictures of decoded video 113 to generate output video sequence 114 of video pictures such that output video sequence 114 has an increased resolution with respect to decoded video 113. The increase in resolution may be an increase by any amount such as a 2×, 4×, 8× or more increase in resolution in both axes (i.e., the vertical and horizontal dimensions). In some embodiments, output video sequence 114 has the same resolution as input video sequence 111. In some embodiments, output video sequence 114 has a lower resolution with respect to input video sequence 111. In an embodiment, the resolution of output video sequence 114 is not less than eight times the resolution of decoded video 113 in both the vertical and horizontal directions. In an embodiment, the resolution of output video sequence 114 is not less than four times the resolution of decoded video 113 in both the vertical and horizontal directions. In an embodiment, the resolution of output video sequence 114 is not less than twice the resolution of decoded video 113 in both the vertical and horizontal directions.

As discussed, decompression GAN 104 (i.e., a pretrained decompression upsampling portion of a GAN) further improves the perceptual quality of pictures of decoded video 113 to generate output video sequence 114. Such improved perceptual quality may manifest itself in a variety of ways such as increased and/or improved texture, reduced and/or improved blur, increased and/or improved edges, sharper image portions, and so on. Notably, the same regions of output video sequence 114 with respect to decoded video 113 may have increased resolution (e.g., pixel count for the same object being imaged) and both improved perceptual based on assessment of a human or objective methods (e.g., computational methods predictive of image quality). Such objective methods may include greater texture (e.g., based on variance measure, sharpness measure, measures of horizontal and vertical gradients, etc. with larger values indicating more texture).

Notably, decompression GAN 104 simultaneously both up-samples each picture of decoded video 113 by a given factor (e.g., ×8 on height and ×8 on width) and improves its perceptual quality by reducing compression artifacts. As discussed, such perceptual quality improvements do not faithfully recreate pixel by pixel texture from a reference picture but instead improve perceptual quality by meeting user and viewer expectation as to the proper texture for each element of the picture. Using such techniques, the bitrate of bitstream 112 can be drastically reduced while providing a high perceptual quality output video sequence 114.

Figure 5:
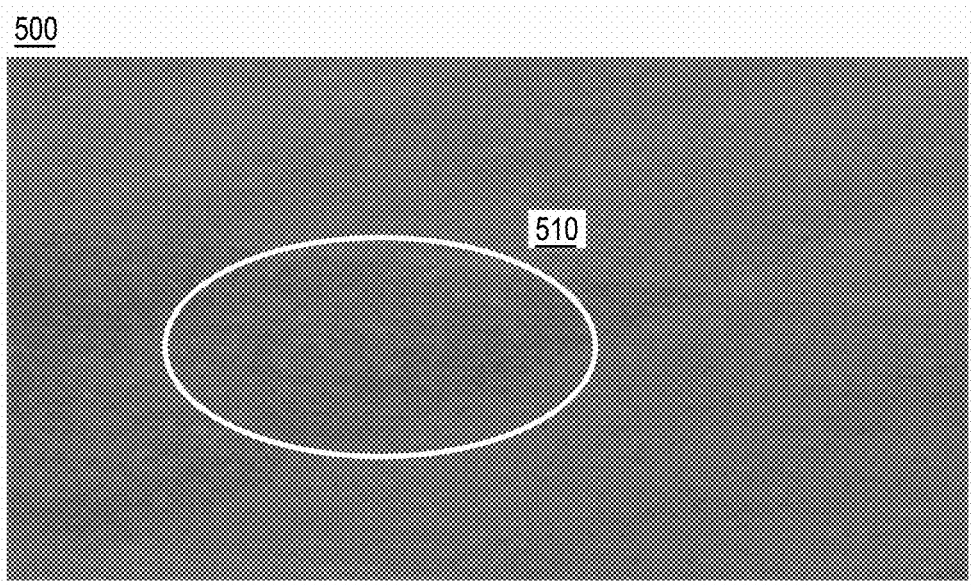
FIG. 5 illustrates an example upsampled and perceptual quality improved video picture based on application of a decompression GAN to a decoded video picture.

FIG. 5 illustrates an example upsampled and perceptual quality improved video picture 500 based on application of decompression GAN 104 to decoded video picture 300, arranged in accordance with at least some implementations of the present disclosure. As shown in FIG. 5, video picture 500 has improved grass texture representative of what is expected by a human viewer for improved perceptual quality. As shown with respect to decoded video picture 300, region 510 has both a higher resolution and increased texture (in terms of subjective assessment and an objective assessment including variance measures).

Figure 6:
FIG. 6 illustrates an example upsampled and perceptual quality improved video picture based on application of a decompression GAN to a decoded video picture.

FIG. 6 illustrates an example upsampled and perceptual quality improved video picture 600 based on application of decompression GAN 104 to decoded video picture 400, arranged in accordance with at least some implementations of the present disclosure. As shown in FIG. 6, video picture 600 has improved human body shapes as is expected by a human viewer for improved perceptual quality. Video picture 600 is representative of a portion of a scene including grass (e.g., a soccer field). Video picture 600 has both a higher resolution and, as shown with respect to persons 611, 612, increased perceptual quality.

Returning to FIG. 1, video sequence 114 may be used for any suitable purpose. In some embodiments, video sequence 114 is transmitted for viewing by a user of system 110 or another system. In some embodiments, video sequences 114 are representative of video from all views of camera array 201 and may be used to build a point cloud to create a volumetric model, which is then painted with captured texture from video sequence 114 to provide a photo realistic 3D model of scene 210. Furthermore, the photo realistic 3D model may be used to provide a view from a virtual camera anywhere within the photo realistic 3D model. Thereby, the virtual camera may be controlled to navigate in the 3D space of scene 210 and the observed view may be rendered to offer multiple degrees of freedom for an immersive user experience. For example, the 3D model generation may include object detection, image segmentation, 3D point cloud reconstruction, and point cloud rendering to add texture. The rendered 3D model may then be used to generate a virtual image from any point within the scene represented by the 3D model.

Figure 7:
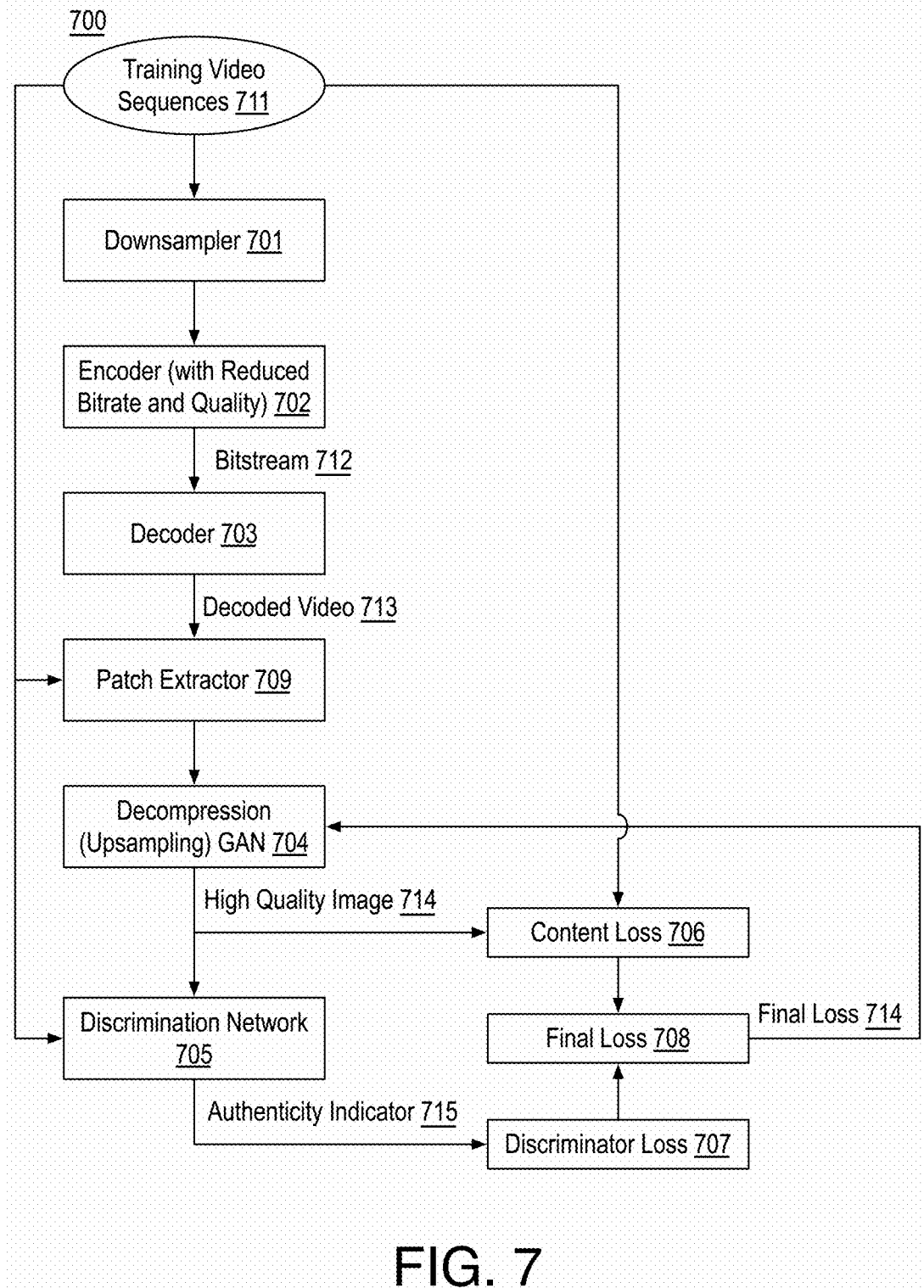
FIG. 7 illustrates an exemplary system for training a decompression GAN.

FIG. 7 illustrates an exemplary system 700 for training decompression GAN 104, arranged in accordance with at least some implementations of the present disclosure. As shown in FIG. 7, system 700 includes a downsampler 701, encoder 702 (to perform encode with reduced bitrate and quality), a decoder 703, a decompression GAN 704 (which, after training is finalized, may be implemented as decompression GAN 104), a discrimination network 705, a content loss module 706, a discriminator loss module 707, and a final loss module 708. System 700 may be implemented via any form factor and/or device(s) as discussed with respect to systems 100, 110. Furthermore, downsampler 701, encoder 702, and decoder 703 may perform any operation as discussed with respect to downsampler 101, encoder 102, and decoder 103.

In some embodiments, system 700 performs GAN training by creating two competing networks (e.g., decompression GAN 704 and discrimination network 705). The goal of the discrimination network 705 is to correctly classify input images thereto as either real images or generator outputs (e.g., outputs from decompression GAN 704). The goal of decompression GAN 704 is to create images that are indistinguishable from real images (e.g., that discrimination network 705 cannot correctly classify). Both networks are trained alternatively and when an equilibrium is reached or a specific number of training steps are preformed, training is complete. Discrimination network 705 is then discarded and decompression GAN 704 is implemented in an implementation phase to perform the task for which it was trained.

As shown, system 700 attains a training set of video sequences 711. Training set of video sequences 711 may have any characteristics as discussed with respect to input video sequence 111 in terms of format, resolution, etc. Training set of video sequences 711 may be attained via camera array 201 or may otherwise correspond to the video or pictures attained via camera array 201 such that suitable training that mimics a specific implementation may be performed. Such training set of video sequences 711 may be at any level of detail such as matching only the expected format of video to be employed, video from the same venue, video of the same sport in the same venue, video of the same teams playing the same sport in the same venue, etc. Furthermore, as discussed further herein, in some embodiments, different decompression GANs may be applied to different portions of decoded video. In such contexts, the different decompression GANs are trained using different training set of video sequences 711 such as a decompression GAN for foreground decompression, a decompression GAN for detected people, a decompression GAN for a detected field of play, a decompression GAN for crowds, etc.

Training set of video sequences 711 is provided to downsampler 701, which performs the same operations as those discussed with respect to downsampler 101 to generate downsampled video. The downsampled video is then encoded by encoder 702, which performs the same operations as those discussed with respect to encoder 102 to generate a compressed bitstream 712. Bitstream 712 is then decompressed by decoder 703, which performs the same operations as those discussed with respect to decoder 103 to generated decoded video 713, which includes decoded video pictures analogous to those discussed with respect to decoded video 713. Such techniques provide a training environment that tends to match the implementation environment.

As discussed, downsampler 701, encoder 702, and decoder 703 perform the same operations as those in the planned system for implementation and are intended to create pictures of decoded video 713 with compression artifacts like those that are expected to arrive to the input of decompression GAN 704 during implementation. The remaining components of system 700 are specific to training decompression GAN 704.

Decoded video 713 is provided to optional patch extractor 709, which may select patches of pictures of decoded video 713 for the training of decompression GAN 704. For example, since decompression GAN 704 has a fully convolutional architecture, any image or picture patch size may be used for the training regardless of the image size used in the implementation or inference phase discussed with respect to FIG. 1. Therefore, the speed and efficiency of the training of decompression GAN 704 may be enhanced by extracting patches smaller in size than the pictures of decoded video 713 and using the image patches in the training. In addition, smaller patches used in the training limit the receptive fields of decompression GAN 704 and/or discrimination network 705 may force it to rely on small lower lever features as expected in the compression noise to thereby improve the overall perceived quality of the output.

The patches or pictures of decoded video 713 are provided to decompression GAN 704, which, when training is complete, is implemented as decompression GAN 104. For example, an architecture of decompression GAN 704 may be provided and initiated with weights such as randomized weights. Decompression GAN 704 is then applied to the patches or pictures of decoded video 713 to generate a corresponding high quality image 714, which tends to improve as training progresses.

The output of decompression GAN 704, high quality image 714, is provided to discrimination network 705 and content loss module 706. Discrimination network 705, which is also trained (in parallel with the training of decompression GAN 704) using training set of video sequences 711 (e.g., known real pictures and/or picture patches) and high quality image 714 (e.g., a known fake picture and/or picture patch), provides an authenticity indicator 715 responsive to high quality image 714. Authenticity indicator 715 is indicative of whether discrimination network 705 deems high quality image 714 to be real (e.g., output a value of 1) or fake (e.g., output a value of 0).

Also as shown, high quality image 714 is provided to content loss module 706, which determines a difference or loss between high quality image 714 and the corresponding picture or patch of training set of video sequences 711. Content loss module 706 may determine any pixel wise loss between high quality image 714 and the corresponding picture or patch of training set of video sequences 711 such as mean square error (MSE) or the like.

In the first training step, discriminator loss 707 is back propagated through discrimination network 705 while weights of decompression GAN 704 remain fixed. Such processing improves the ability of discrimination network 705 to correctly distinguish between decompressed and real images or patches Then, final loss module 708 receives the content loss (e.g., MSE) and discriminator loss (e.g., an inverse cross entropy on classifier output) from discriminator loss module 707. Thereby, a combined loss of both pixel-wise MSE (e.g., content loss) and discriminator loss (e.g., inverse cross entropy on classifier output) is generated for back propagation through decompression GAN 704 while keeping the weights of discrimination network 705 fixed. Such techniques better ensure consistency between the output of decompression GAN 704 and the original image.

Such techniques are repeated until decompression GAN 704 is trained. Such training may be complete when an equilibrium is reached between decompression GAN 704 and discrimination network 705 or when a predefined number of steps is reached. As discussed, in implementation, discrimination network 705 is discarded and the pre-trained decompression GAN 704 is implemented as decompression GAN 104 (e.g., a pretrained decompression upsampling portion of a generative adversarial network).

Decompression GAN 704 and discrimination network 705 may have any suitable architectures. In some embodiments, decompression GAN 704 is a convolutional neural network (CNN). As used herein, the term CNN indicates a pretrained deep learning neural network including an input layer, multiple hidden layers, and an output layer such that the hidden layers include one or more of convolutional layers each including at least a convolutional layer (and optionally including, for example, a leaky RELU layer, a pooling or summing layer, and/or a normalization layer). The CNN may also include a fully connected layer.

Figure 8:
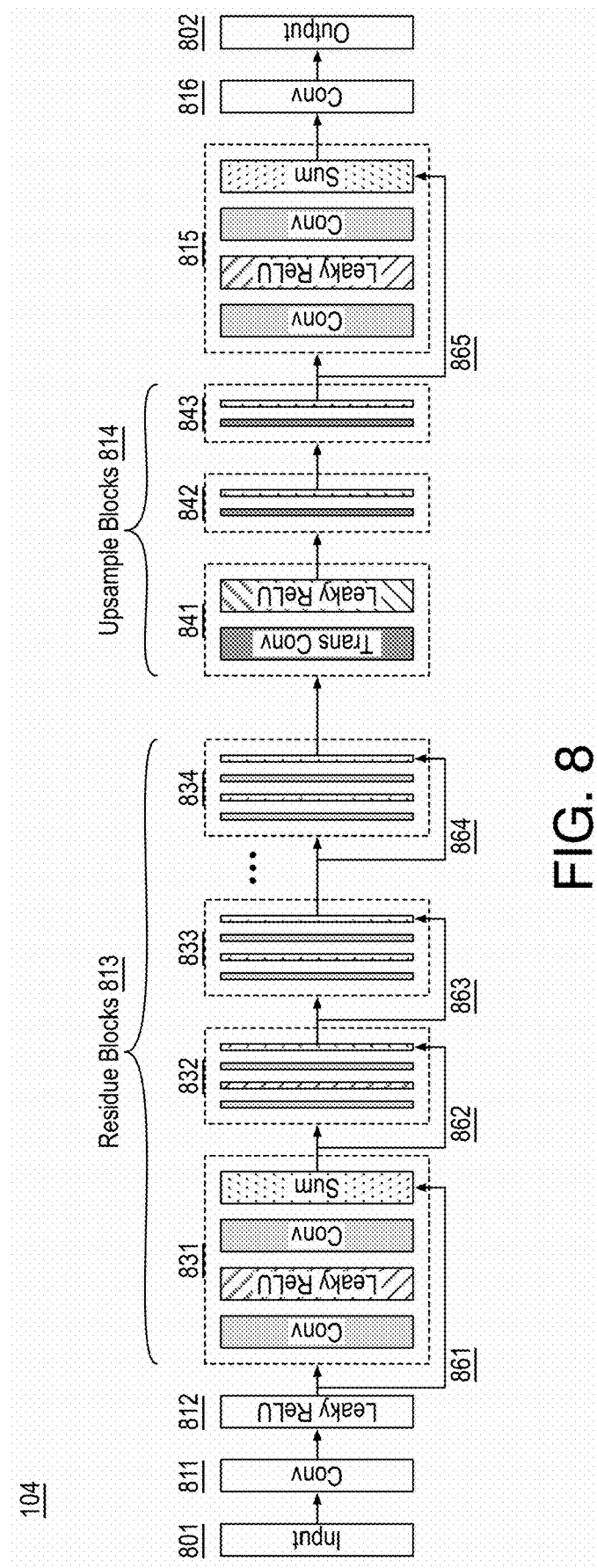
FIG. 8 illustrates an exemplary decompression GAN.

FIG. 8 illustrates an exemplary decompression GAN 104, arranged in accordance with at least some implementations of the present disclosure. As shown in FIG. 8, decompression GAN 104 (e.g., a pretrained decompression upsampling portion of a generative adversarial network) includes an input layer 801, followed by a convolutional layer (Cony) 811, followed by a leaky rectified linear unit (ReLU) layer 812, followed by multiple residue blocks 813, followed by multiple upsample blocks 814, followed by a residue block 815, followed by a convolutional layer 816, followed by an output layer 802.

Furthermore, as shown, each of residue blocks 813, 815 includes a convolutional layer (Cony), followed by a leaky rectified linear unit layer, followed by a convolutional layer, followed by a summing layer (sum). Each of residue blocks 813, 815 may also include batch normalization layers between the convolutional and leaky rectified linear unit layers, which normalize the feature maps from the preceding convolutional layer. Each of upsample blocks 814 includes a transposed convolutional layer followed by a leaky rectified linear unit layer. As used herein, a residue block of a network indicates a block that includes at least one convolutional layer, followed by at least one leaky rectified linear unit layer, followed by at least one summing layer such that each residue block takes as input an input image or feature map and outputs a feature map including residues corresponding to the convolutional kernels applied by the residue block. As used herein, an upsample block of a network indicates a block that includes at least one transposed convolutional layer followed by at least one leaky rectified linear unit layer such that each upsample block takes as input a feature map and outputs an upsampled feature map or output image including, at a final upsample block, pixel values for an output image. Also as shown in FIG. 8, decompression GAN 104 includes skip connections 861, 862, 863, 864 such that outputs of residue blocks may be fed forward and summed at the summing layer of the next residue block.

Notably, decompression GAN 104 includes, in order, multiple residue blocks 831, 832, 833, 834, followed immediately by multiple upsample blocks 841, 842, 843, followed immediately by one or more residue blocks 815, followed immediately by convolutional layer 816, followed immediately by an output layer. As discussed, each of multiple residue blocks 831, 832, 833, 834 includes a convolutional layer followed by a leaky rectified linear unit layer, followed by a convolutional layer, followed by a summing layer. Each convolutional layer scans a number of convolutional kernels across an input feature map (except convolutional layer 811), which applies the convolutional kernels to an input picture (such as a picture of decoded video 113) and within a receptive field to generate a value of a feature map. Each leaky rectified linear unit layer applies an activation function to the values of the feature and each summing layer sums portions of the feature maps to reduce the spatial size of the output feature maps. Each transposed convolutional layer (or deconvolutional layer) applies a transposed convolution kernel to one or more values of the input feature map to generate an upsampled feature map (e.g., a one to many or some to many deconvolution). Each leaky rectified linear unit layer applies an activation function to the values of the feature map. Decompression GAN 104 may include any number of residue blocks 813 such as four, five, six residue blocks 813, any number of upsample blocks 814 such as zero, three or four upsample blocks 814, and one or more residue blocks 815.

In some embodiments, convolutional layer 811 applies 64 kernels having a kernel size of 9 with a stride of 1, one or more convolutional layers of residue blocks 813 apply 64 kernels having a size of 3 with a stride of 1, residue block 815 applies 256 kernels having a kernel size of 3 with a stride of 1, and convolutional layer 816 applies 9 kernels having a kernel size of 3 with a stride of 1, although any numbers and sizes of kernels may be used. In some embodiments, the transpose convolutional layers of upsample blocks 814 apply 256 kernels having a kernel size of 3 with a stride of 1, although, again, any numbers and sizes of kernels may be used.

As shown, a final upsampled feature map is provided to residue block 815, which applies a convolutional layer, a leaky rectified linear unit layer, and a summing layer as discussed above to provide a feature map. The resultant feature map is provided to convolutional layer 816, which generates an output image (e.g., a picture of output video sequence 114). In particular, applying multiple residue blocks 831, 832, 833, 834, followed immediately by multiple upsample blocks 841, 842, 843, followed immediately by one or more residue blocks 815, followed immediately by convolutional layer 816, followed immediately by output layer 802 provides improved network stability and performance in the context of perceptual quality improvement of encode/decode artifacts discussed herein.

Figure 9:
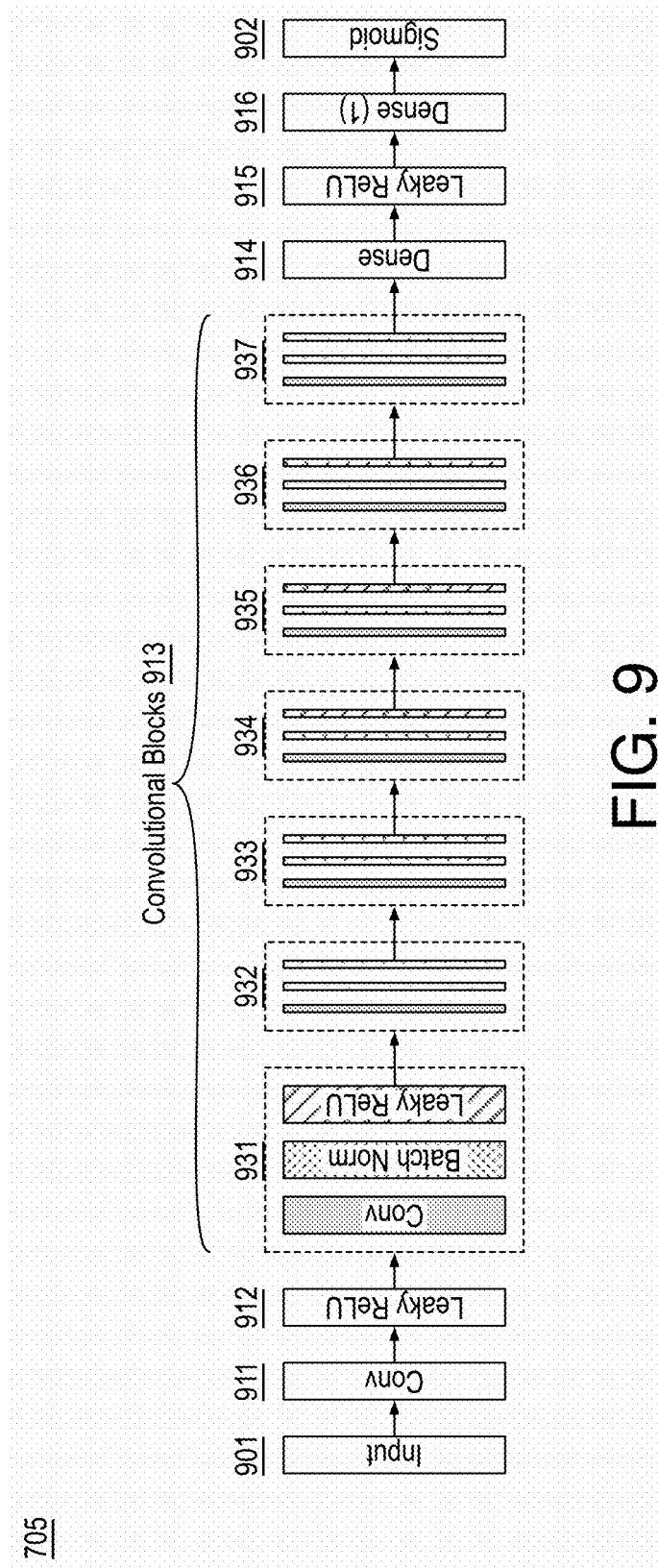
FIG. 9 illustrates an exemplary discrimination network.

FIG. 9 illustrates an exemplary discrimination network 705, arranged in accordance with at least some implementations of the present disclosure. As shown in FIG. 9, discrimination network 705 includes an input layer 901, followed by a convolutional layer 911, followed by a leaky rectified linear unit layer 912, followed by multiple convolutional blocks 913, followed by dense layer 914, followed by a rectified linear unit layer 915, followed by a dense layer 916, followed by a sigmoid layer 902 (or output layer). As discussed, discrimination network 705 provides a discriminator network of the GAN. The input to discrimination network 705 is either a real picture or patch (e.g., a training picture or patch) or a reconstructed picture or patch output from decompression GAN 704, and the task of discrimination network 705 is to identify the true source of the image. For example, discrimination network 705 may provide a cross entropy loss (e.g., discriminator loss) for use in training decompression GAN 704.

Furthermore, as shown, each of convolutional blocks 913 includes a convolutional layer, followed by a batch normalization layer, followed by a leaky rectified linear unit layer, which may perform operations as discussed with respect to FIG. 8. Also as shown in FIG. 9, each of convolutional blocks 931, 932, 933, 934, 935, 936, 937 follows a previous one of convolutional blocks 931, 932, 933, 934, 935, 936, 937 (or a leaky rectified linear unit layer with respect to convolutional block 931). Any number of convolutional blocks 913 may be implemented such as six, seven, or eight. As shown, convolutional blocks 913 are followed by a dense layer 914 which may provide a fully connected layer, rectified linear unit layer 915, and dense layer 916, which may provide a fully connected layer to a single value, and a sigmoid layer 902, which may apply a sigmoid output function to provide a resultant probability (e.g., a value from zero to one) as to whether the input image or picture provided at input layer 901 is a real image.

Figure 10:
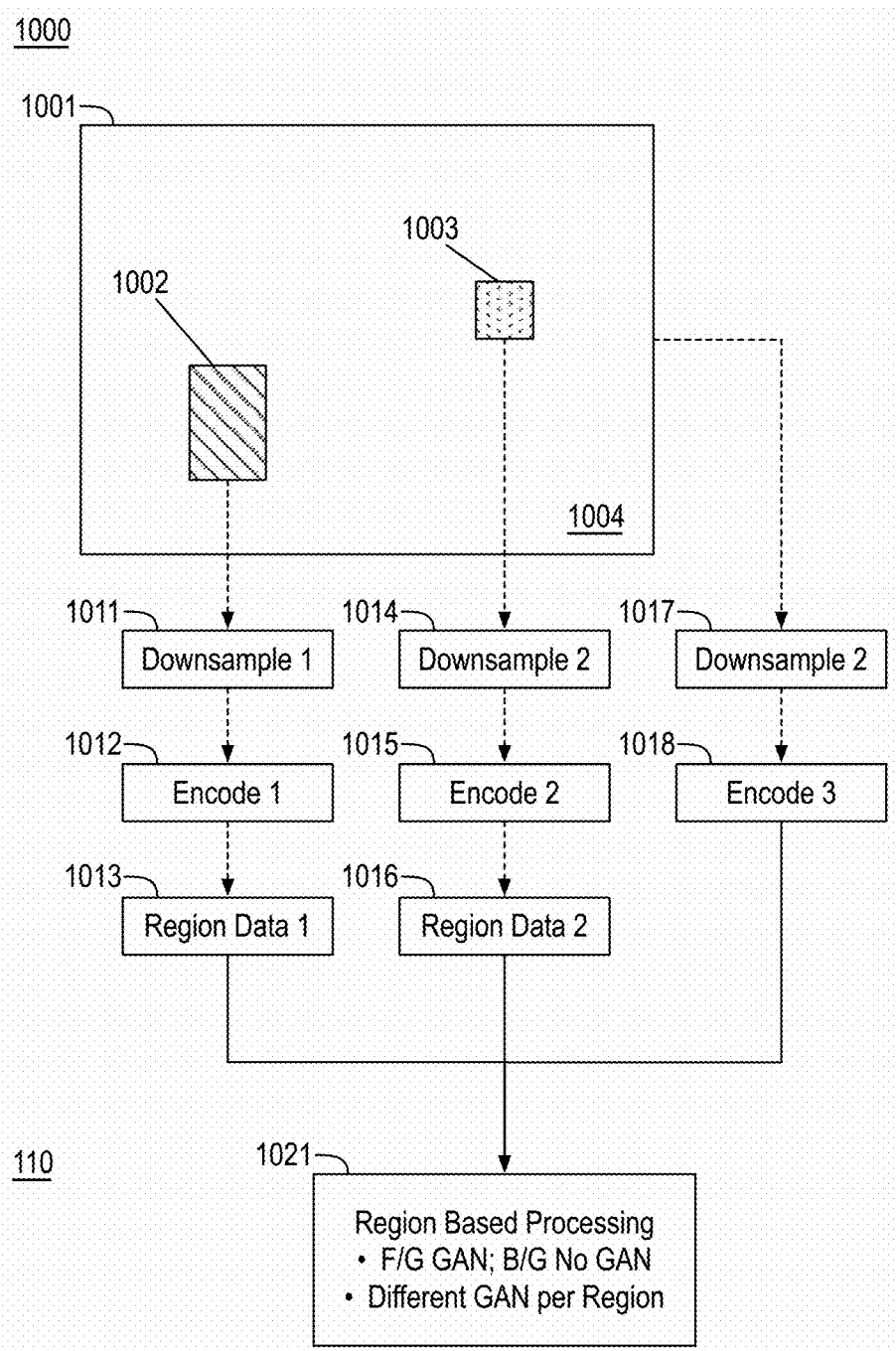
FIG. 10 illustrates an exemplary process for providing region dependent downsampling, encode, and/or decompression GAN processing.

Notably, discrimination network 705 includes, in order, convolutional blocks 931, 932, 933, 934, 935, 936, 937, followed immediately by dense layer 914, followed immediately by leaky rectified linear unit layer 915, followed immediately by dense layer 916, followed immediately by sigmoid layer 902. Such an architecture provides a discrimination network 705 to balance training of decompression GAN 104 to provide an improved decompression GAN in the context of perceptual quality improvement of encode/decode artifacts discussed herein FIG. 10 illustrates an exemplary process for providing region dependent downsampling, encode, and/or decompression GAN processing, arranged in accordance with at least some implementations of the present disclosure. As shown in FIG. 10, an input picture 1001 is received for processing. Input picture 1001 may be a picture of input video sequence 111 or a downsampled picture of input video sequence 111. Input picture 1001 undergoes segmentation processing to divide input picture 1001 into regions such as regions 1002, 1003, 1004. Such segmentation processing may include any processing such as background extraction processing, motion/non-motion extraction processing, person detection processing, etc.

Furthermore, regions 1002, 1003, 1004 may include any number of regions from any number of potential regions. In an embodiment, only two region types are applied such as foreground regions and background regions. In some embodiments, regions 1002, 1003, 1004 may include region labels such as a person label, an object label, a region of interest label, etc. Regions 1002, 1003, 1004 may be any suitable shape and size although square and rectangular shapes are preferred for ease of use.

As shown, each of regions 1002, 1003, 1004 may undergo one or more of different downsample processing and different encode processing at system 1000 responsive to the region type thereof. For example, in the context of foreground and background regions, the foreground region(s) may be downsampled using a smaller downsample factor at downsample operations 1011, 1014 or such regions may not be downsampled at all. In contrast, background region 1004 may be downsampled by a larger downsample factor at downsample operation 1017 in response to being a background region. In an embodiment, foreground region(s) 1002, 1003 may be downsampled by a factor of 2 in each direction (or not at all) and background region 1004 may be downsampled by a factor of 8 in both directions. Although discussed with respect to downsampling factors of 2 and 8, any downsampling factors may be used such that the downsample factor for background region 1004 is greater than that of foreground region(s) 1002, 1003. Such downsampling takes into account the relative importance of foreground region(s) 1002, 1003 to an eventual viewer and the likelihood that subsequent decompression GAN processing may improve the perceptual quality of background region 1004 more than that of foreground region(s) 1002, 1003.

Similarly, in the context of region types, particular foreground region(s) such as a player region 1002 may be downsampled using a smaller downsample factor at downsample operation 1011 or such regions may not be downsampled at all while other foreground region(s) such as a referees or field object region 1003 are downsampled at a higher downsample factor at downsample operation 1014. Furthermore, background region 1004 may be downsampled by a higher still downsample factor at downsample operation 1017 in response to being a background region. In an embodiment, foreground region(s) 1002 pertaining to an object of interest may be downsampled by a factor of 2 in each direction (or not at all), foreground region(s) 1003 pertaining to an object that is not of interest may be downsampled by a factor of 4 in each direction and background region 1004 may be downsampled by a factor of 8 in both directions. Although discussed with respect to downsampling factors of 2, 4, and 8, any downsampling factors may be used such that the downsample factor for an object of interest region 1002 is greater than that of an object of lower interest region 1003, which is greater than that of background region 1004.

Furthermore, different region based encoding may be applied. Referring again to the context of foreground and background regions, the foreground region(s) 1002, 1003 may be encoded using a higher bitrate at encode operations 1012, 1015. In contrast, background region 1004 may be encoded using a lower bitrate at encode operation 1018 in response to being a background region. Any bitrates may be used such that the bitrate applied to foreground region(s) 1002, 1003 is higher than that applied with respect to the background region 1004. As with downsampling, such encode variation takes into account the relative importance of foreground region(s) 1002, 1003 to an eventual viewer and the likelihood that subsequent decompression GAN processing may improve the perceptual quality of background region 1004 more than that of foreground region(s) 1002, 1003.

In the context of region types, object of interest foreground region 1002 may be encoded using a higher bitrate at encode operation 1012, object of lower interest region 1003 may be encoded using a medium bitrate at encode operation 1015, and background region 1004 may be encoded using a lower bitrate at encode operation 1018 in response to being a background region. Any bitrates may be used such that the bitrate applied to object of interest region 1002 is greater than that applied to object of lower interest region 1003, which is in turn greater than the bitrate applied to background region 1004.

As shown with respect to region data operations 1013, 1016, region(s) 1002, 1003 may be signaled to system 110 such that particular decompression GAN processing may be applied thereto. It is noted that region 1004 does not need to be signaled as it is the remainder of input picture 1001. For example, region data operations 1013, 1016 may generate region data or indicators indicative of region(s) 1002, 1003 including, for example, top left corner locations of region(s) 1002, 1003 and the size (e.g., height and width) or bottom right corner locations of region(s) 1002, 1003 or similar data structures. In some embodiments, the region data or indicators further includes a region type (or corresponding object) for each of region(s) 1002, 1003 signaling, for example, a person region, a ball region, etc.

System 110 may receive such region data or indicators and system 110 may apply different decompression GANs based on the regions as shown with respect to region based processing operation 1021 to the pertinent picture of decoded video 113. In an embodiment, different pretrained particular decompression GANs have differing weights and parameters or even differing architectures pertinent to different region(s) 1002, 1003, 1004 based on the region type.

In an embodiment, decompression GAN is applied only to foreground regions 1002, 1003 and no decompression GAN is applied to background region 1004. In an embodiment, a first decompression GAN is trained for foreground regions 1002, 1003 and a second decompression GAN is trained for background region 1004. Such training may be performed as discussed with respect to FIG. 7 by selecting pertinent training video sequences (e.g., foreground images to train the foreground decompression GAN and background images to train the background decompression GAN). System 110 may receive region data indicative of foreground regions and apply a foreground decompression GAN to such foreground regions. Furthermore, system 110 may apply a background decompression GAN to remaining regions.

In some embodiments, a first decompression GAN is trained for a first object type such as a person, a player, a sports object, etc., a second decompression GAN is trained for a second object type, and so on, and a background decompression GAN is trained for background region 1004. Such training may again be performed as discussed with respect to FIG. 7 by selecting pertinent training video sequences having pictures of such object types. System 110 may then receive region data indicative of different region(s) 1002, 1003 and system 100 may apply the pertinent pretrained decompression GAN corresponding to the region.

With reference to FIG. 1, such multiple pretrained decompression GANs may be applied to decoded video 113 to generate output video sequence 114, which may be further processed using any suitable technique or techniques discussed herein.

Figure 11:
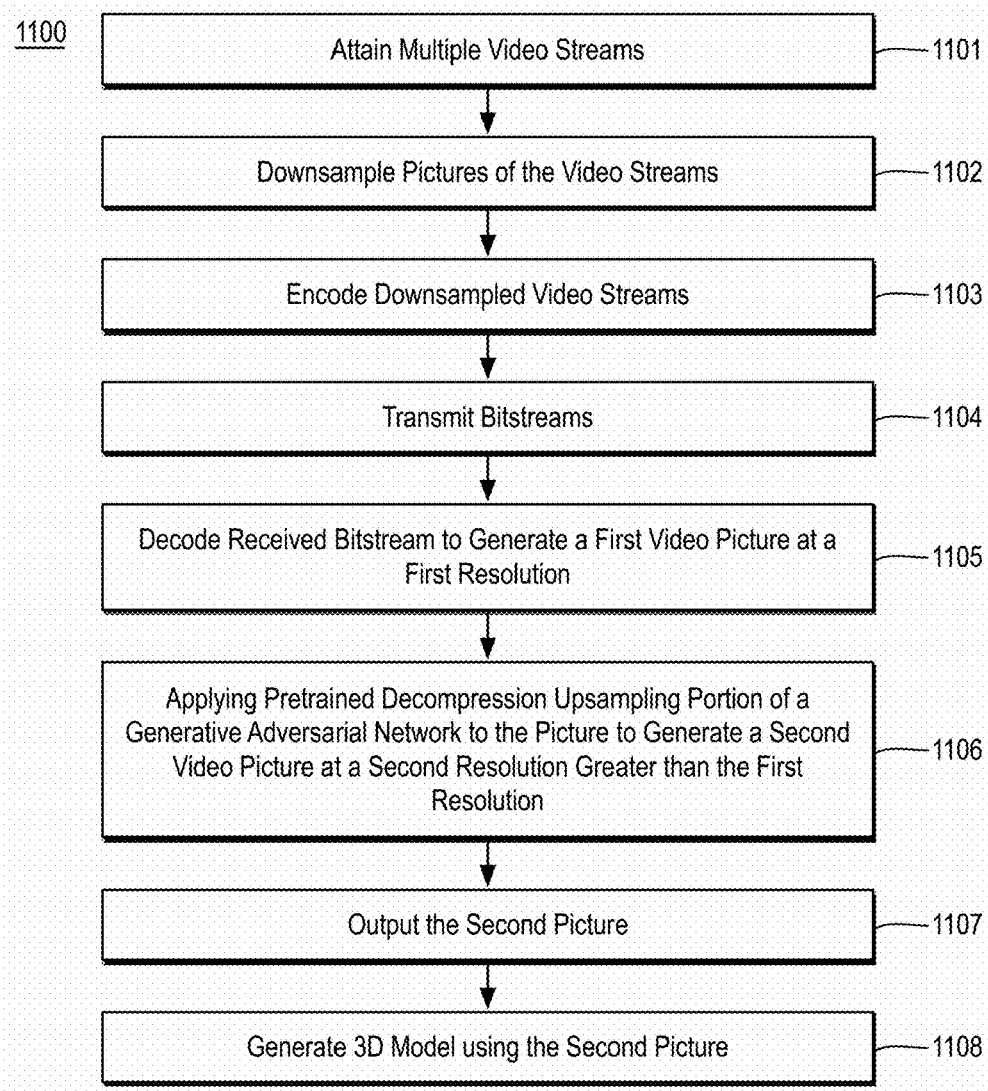
FIG. 11 is a flow diagram illustrating an example process for generating a 3D model from multiple video streams attained from cameras trained on a scene.

FIG. 11 is a flow diagram illustrating an example process 1100 for generating a 3D model from multiple video streams attained from cameras trained on a scene, arranged in accordance with at least some implementations of the present disclosure. Process 1100 may include one or more operations 1101-1108 as illustrated in FIG. 11. Process 1100 may form at least part of a 3D model generation or video compression/decompression process. By way of non-limiting example, process 1100 may form at least part of a 3D model generation process as performed by systems 100, 110 as discussed herein. Furthermore, process 1100 will be described herein with reference to system 1200 of FIG. 12.

Figure 12:
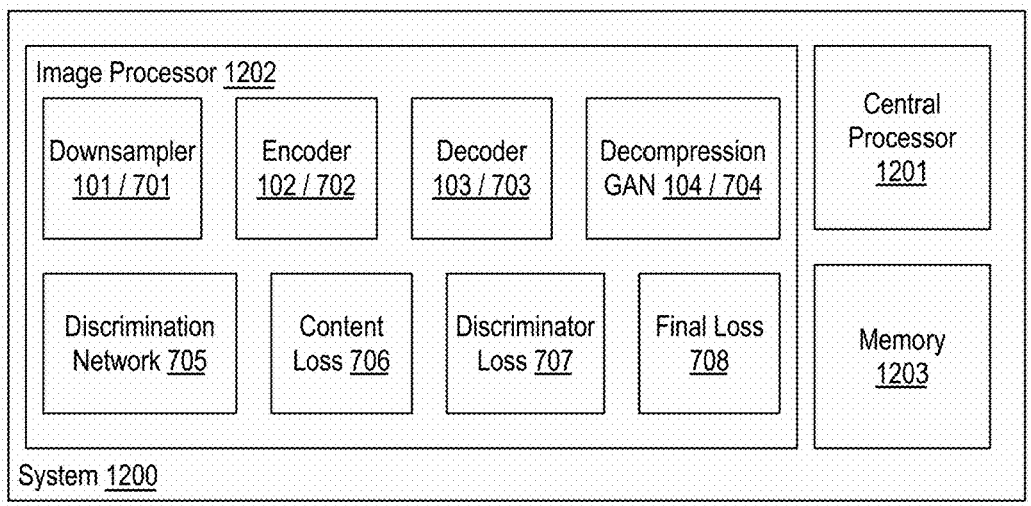
FIG. 12 is an illustrative diagram of an example system for generating a 3D model from multiple video streams attained from cameras trained on a scene.

FIG. 12 is an illustrative diagram of an example system 1200 for generating a 3D model from multiple video streams attained from cameras trained on a scene, arranged in accordance with at least some implementations of the present disclosure. As shown in FIG. 12, system 1200 may include a central processor 1201, an image processor 1202, and a memory 1203 Also as shown, image processor 1202 may include or implement one or more of downsampler 101, downsampler 701, encoder 102, encoder 702, decoder 103, decoder 703, decompression GAN 104, decompression GAN 704, discrimination network 705, content loss module 706, discriminator loss module 707, and final loss module 708. In the example of system 1200, memory 1203 may store picture data, downsampled picture data, low resolution picture data, bitstream data, decoded or reconstructed video picture data, decompression network parameters or data, output video sequence data or picture data, or any other data discussed herein.

As shown, in some examples, one or more or portions of downsampler 101, downsampler 701, encoder 102, encoder 702, decoder 103, decoder 703, decompression GAN 104, decompression GAN 704, discrimination network 705, content loss module 706, discriminator loss module 707, and final loss module 708 are implemented via image processor 1202. In other examples, one or more or portions of downsampler 101, downsampler 701, encoder 102, encoder 702, decoder 103, decoder 703, decompression GAN 104, decompression GAN 704, discrimination network 705, content loss module 706, discriminator loss module 707, and final loss module 708 are implemented via central processor 1201, an image processing unit, an image processing pipeline, an image signal processor, or the like. In some examples, one or more or portions of downsampler 101, downsampler 701, encoder 102, encoder 702, decoder 103, decoder 703, decompression GAN 104, decompression GAN 704, discrimination network 705, content loss module 706, discriminator loss module 707, and final loss module 708 are implemented in hardware as a system-on-a-chip (SoC). In some examples, one or more or portions downsampler 101, downsampler 701, encoder 102, encoder 702, decoder 103, decoder 703, decompression GAN 104, decompression GAN 704, discrimination network 705, content loss module 706, discriminator loss module 707, and final loss module 708 are implemented in hardware via a FPGA.

Image processor 1202 may include any number and type of image or graphics processing units that may provide the operations as discussed herein. Such operations may be implemented via software or hardware or a combination thereof. For example, image processor 1202 may include circuitry dedicated to manipulate and/or analyze images obtained from memory 1203. Central processor 1201 may include any number and type of processing units or modules that may provide control and other high level functions for system 1200 and/or provide any operations as discussed herein. Memory 1203 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1203 may be implemented by cache memory. In an embodiment, one or more or portions of downsampler 101, downsampler 701, encoder 102, encoder 702, decoder 103, decoder 703, decompression GAN 104, decompression GAN 704, discrimination network 705, content loss module 706, discriminator loss module 707, and final loss module 708 are implemented via an execution unit (EU) of image processor 1202. The EU may include, for example, programmable logic or circuitry such as a logic core or cores that may provide a wide array of programmable logic functions. In an embodiment, one or more or portions of downsampler 101, downsampler 701, encoder 102, encoder 702, decoder 103, decoder 703, decompression GAN 104, decompression GAN 704, discrimination network 705, content loss module 706, discriminator loss module 707, and final loss module 708 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 11, process 1100 begins at operation 1101, where multiple video streams are attained. In an embodiment, the multiple video streams are attained from corresponding cameras trained on a scene such that the scene may be a high profile event for which a virtual view experience is desirable. Such multiple video streams may be attained from cameras, a memory, another system or device, etc. For example, the video streams may be contemporaneous video streams attained from corresponding cameras trained on a scene.

Processing continues at operation 1102, where pictures of the video streams are downsampled. For example, each of the contemporaneous video streams (e.g., each picture of each video stream) may be downsampled. The pictures of the video streams may be downsampled using any suitable technique or techniques and according to any downsampling factor such as 2×, 4×, or 8× downsampling with 8× downsampling being particularly advantageous. In an embodiment, anti-aliasing filtering is applied prior to downsampling. In some embodiments, different portions of the pictures are downsampled at different downsampling rates. In an embodiment, a foreground may be downsampled at a lower rate (or not at all) while a background is downsampled at a higher rate. In some embodiments, regions of interest (e.g., containing objects of interest) are downsampled at a low rate (or not at all), regions of moderate interest (e.g., containing objects of lesser interest) are downsampled at a low rate (or not at all), and background regions are downsampled at a high rate.

Processing continues at operation 1103, where the downsampled video streams are encoded. For example, each of the downsampled contemporaneous video streams may be encoded to generate corresponding bitstreams. The encode may be performed using any suitable technique or techniques such as standards compliant encode techniques. In some embodiments, different portions of the downsampled pictures are encoded at different bitrates. In an embodiment, a foreground may be encoded at a higher bitrate while a background is encoded at a lower bitrate. In some embodiments, regions of interest (e.g., containing objects of interest) are encoded at a high bitrate, regions of moderate interest (e.g., containing objects of lesser interest) are encoded at a medium bitrate (or not at all), and background regions are encoded at a low bitrate.

Processing continues at operation 1104, where the bitstreams are transmitted to a remote device, stored for later processing, or the like. In particular, the techniques applied at operations 1102, 1103 provide for very low bitrate bitstreams relative to the resolution of the video attained at operation 1101. Furthermore, the downsample operation allows for fewer available encoders (e.g., hardware encoders) to encode a larger number of video streams. Thereby, processing and transmission requirements at a scene or other remote location are reduced.

Processing continues at operation 1105, where the bitstreams generated at operation 1104 are decoded. In an embodiment, a received bitstream is decoded to generate a decoded or reconstructed video sequence including any number of decoded or reconstructed video pictures. In an embodiment, a received bitstream is decoded to generate a first video picture of a decoded video stream such that the picture comprises a first resolution. The first resolution may be any resolution corresponding to the resolution of the downsampled video such as 480p resolution, 720p resolution, or similar low resolution. Furthermore, the received bitstream has a bitrate expressed in bits per second. Notably, the received bitstream has a very low bitrate relative to the resolution of the downsampled (and decoded) video. In an embodiment, the decoded video has a resolution of 480p and a bitrate of not more than 0.5 megabits per second. In an embodiment, a ratio of a bitrate of the received bitstream to the resolution of the decoded video is not more than two bits per second per pixel. In an embodiment, a ratio of a bitrate of the received bitstream to the resolution of the decoded video is not more than 1.75 bits per second per pixel. In an embodiment, a ratio of a bitrate of the received bitstream to the resolution of the decoded video is not more than 1.5 bits per second per pixel.

Processing continues at operation 1106, where a pretrained decompression upsampling portion of a generative adversarial network is applied to the decoded or reconstructed video sequence to upsample and apply texture to the decoded or reconstructed video sequence. In an embodiment, a pretrained decompression upsampling portion of a generative adversarial network is applied to a first video picture to upsample and apply texture to the first video picture to generate a second video picture such that the second video picture as a second resolution greater than the first resolution. The second resolution may be greater than the second resolution by any amount. In an embodiment, the second resolution is not less than eight times the first resolution in both the vertical and horizontal directions (e.g., 64x overall). In an embodiment, the second resolution is not less than four times the first resolution in both the vertical and horizontal directions (e.g., 16× overall).

The pretrained decompression upsampling portion of the generative adversarial network (e.g., decompression GAN) may have any suitable architecture. In an embodiment, the pretrained decompression upsampling portion includes multiple first residue blocks followed by none or multiple upsample blocks followed by at least one second residue block. In some embodiments, each of the first and second residue blocks includes a convolutional layer, a rectified linear unit layer, and a summing layer and each upsample block includes a transposed convolutional layer and a rectified linear unit layer, and the second residue block is followed by a convolutional layer.

The pretrained decompression upsampling portion of the generative adversarial network may be pretrained using any suitable technique or techniques. In an embodiment, process 1100 further includes downsampling a training picture received at the second resolution to the first resolution, encoding the downsampled training picture to generate a second bitstream, decoding the second bitstream to generate a decoded training picture, applying a decompression upsampling portion of the generative adversarial network to the decoded training picture to generate a resultant picture at the second resolution, determining a content loss using the training picture and the resultant picture, applying a discrimination network to the resultant picture to generate an evaluation as to whether the resultant picture is real or fake, determining a discriminator loss based on the evaluation, and training the decompression upsampling portion of the generative adversarial network using a final loss based on both the content loss and the discriminator loss.

In some embodiments, region based decompression GANs may be applied. In an embodiment, a first region indicator corresponding to a first region of the first video picture and a second region indicator corresponding to a second region of the first video picture are received such that the pretrained decompression upsampling portion is applied only to the first region in response to the first region indicator and the pretrained decompression upsampling portion is not applied to the second region in response to the second region indicator. In some embodiments, the first region is a foreground region and the second region is a background region. In an embodiment, a first region indicator corresponding to a first region of the first video picture and a second region indicator corresponding to a second region of the first video picture are received such that the pretrained decompression upsampling portion is applied only to the first region in response to the first region indicator and a second pretrained decompression upsampling portion of a second generative adversarial network is applied to the second region to upsample and apply texture to the second region in response to the second region indicator. In an embodiment, a first bitrate of the first region is greater than a second bitrate of the second region in response to the first region being a region of interest.

Processing continues at operation 1107, where the video sequences generated at operation 1107 may be output for further processing, presentment for display, etc. For example, the second picture of the video sequence may be output. As used herein, the terms output for presentment for display or transmission for presentment for display indicate a video picture or video sequence is stored to memory for future display, transmitted to another device for future display, or transmitted to a display device for display.

Processing continues at operation 1108, where a 3D model may be generated using the video sequence. For example, the second picture of the video sequence may be used to generate a 3D model. The 3D model may be generated using any suitable technique or techniques. In some embodiments, the video sequences representative of contemporaneous video from all views of a scene is used to build a point cloud to create a volumetric model, which is then painted with the texture from the video sequences to provide a photo realistic 3D model of the scene. Virtual views from within the 3D model may then be selected (e.g., by a user) and rendered for presentment.

Process 1100 may be repeated any number of times either in series or in parallel for any number of video streams, video pictures, or the like. Process 1100 may provide for super resolution images, image frames, video frames, etc. that correspond to a low resolution image including a person wearing a predetermined uniform. The techniques discussed herein allow for very large compression (and use of limited numbers of encoders) of input video sequences for transmission of the corresponding bitstreams over limited capacity communications interfaces and for subsequently generated output video sequences after decode with high perceptual quality. As discussed, such techniques may be applied in the context of 3D model generation. However, such techniques may be applied in any suitable context such as video surveillance and other video applications.

Process 1100 may be implemented by any suitable device(s), system(s), or platform(s) such as those discussed herein. In an embodiment, at least a portion of process 1100 is implemented by a device having a memory to store video and/or video pictures, as well as any other discussed data structure, and a processor to perform any of operations 1101-1108. In an embodiment, the memory and the processor are implemented via a monolithic field programmable gate array integrated circuit. As used herein, the term monolithic indicates a device that is discrete from other devices, although it may be coupled to other devices for communication and power supply.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
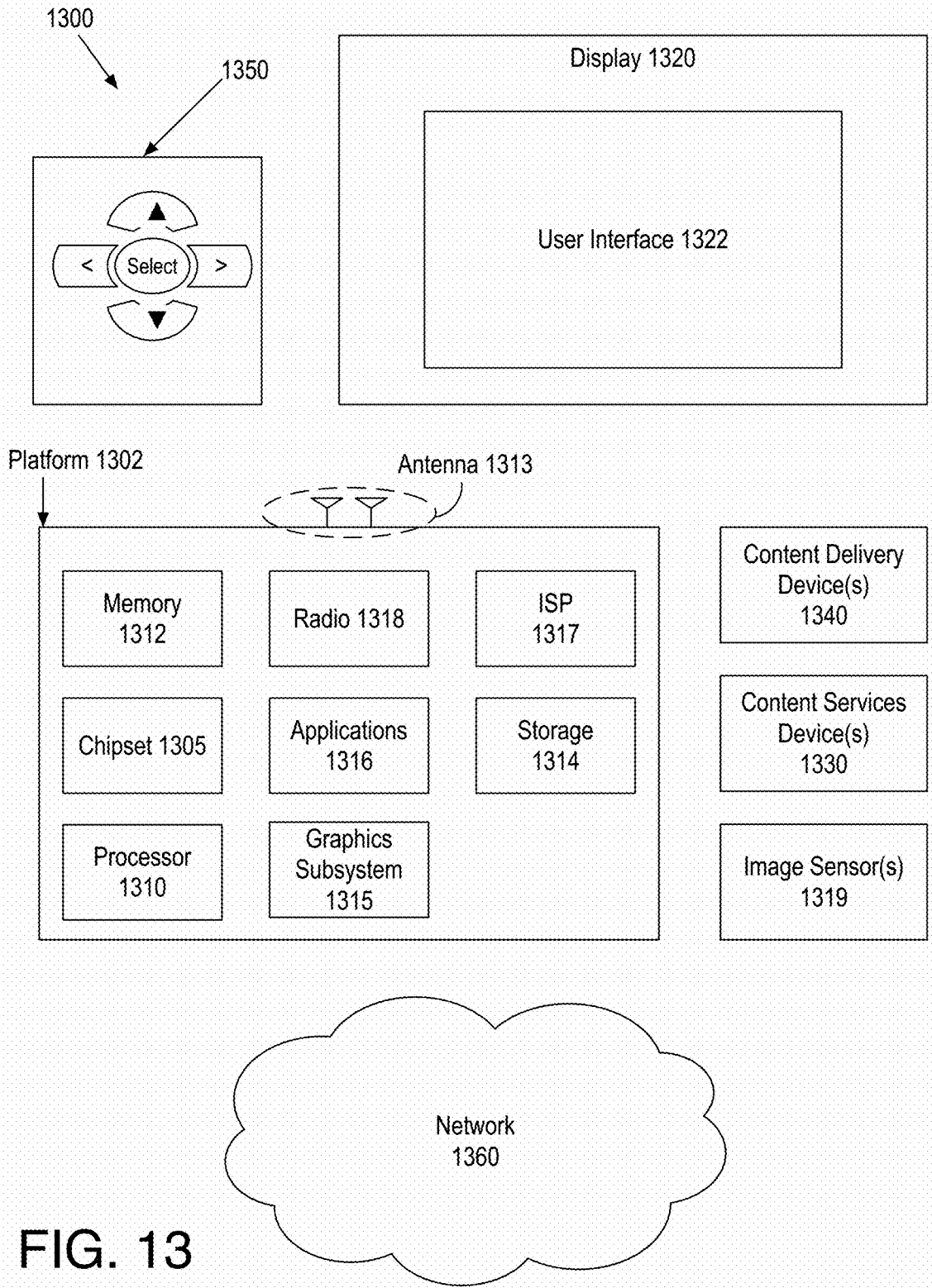
FIG. 13 is an illustrative diagram of an example system.

FIG. 13 is an illustrative diagram of an example system 1300, arranged in accordance with at least some implementations of the present disclosure. In various implementations, system 1300 may be a mobile device system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 1300 includes a platform 1302 coupled to a display 1320. Platform 1302 may receive content from a content device such as content services device(s) 1330 or content delivery device(s) 1340 or other content sources such as image sensors 1319. For example, platform 1302 may receive image data as discussed herein from image sensors 1319 or any other content source. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, antenna 1313, storage 1314, graphics subsystem 1315, applications 1316, image signal processor 1317 and/or radio 1318. Chipset 1305 may provide intercommunication among processor 1310, memory 1312, storage 1314, graphics subsystem 1315, applications 1316, image signal processor 1317 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Image signal processor 1317 may be implemented as a specialized digital signal processor or the like used for image processing. In some examples, image signal processor 1317 may be implemented based on a single instruction multiple data or multiple instruction multiple data architecture or the like. In some examples, image signal processor 1317 may be characterized as a media processor. As discussed herein, image signal processor 1317 may be implemented based on a system on a chip architecture and/or based on a multi-core architecture.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

Image sensors 1319 may include any suitable image sensors that may provide image data based on a scene. For example, image sensors 1319 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1319 may include any device that may detect information of a scene to generate image data.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of navigation controller 1350 may be used to interact with user interface 1322, for example. In various embodiments, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In various embodiments, navigation controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
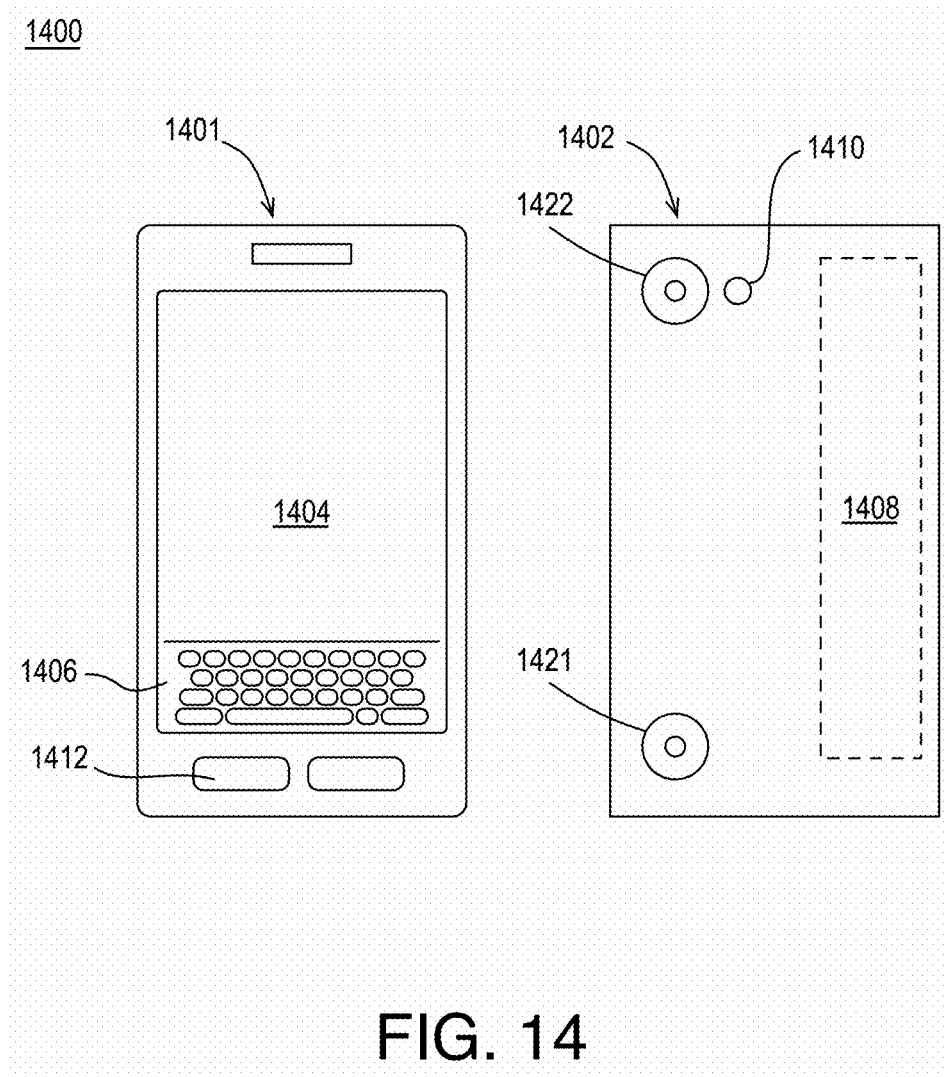
FIG. 14 illustrates an example device, all arranged in accordance with at least some implementations of the present disclosure.

As described above, system 1300 may be embodied in varying physical styles or form factors. FIG. 14 illustrates an example small form factor device 1400, arranged in accordance with at least some implementations of the present disclosure. In some examples, system 1300 may be implemented via device 1400. In other examples, other systems, components, or modules discussed herein or portions thereof may be implemented via device 1400. In various embodiments, for example, device 1400 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 14, device 1400 may include a housing with a front 1401 and a back 1402. Device 1400 includes a display 1404, an input/output (I/O) device 1406, a color camera 1421, a color camera 1422, and an integrated antenna 1408. In some embodiments, color camera 1421 and color camera 1422 attain planar images as discussed herein.

In some embodiments, device 1400 does not include color camera 1421 and 1422 and device 1400 attains input image data (e.g., any input image data discussed herein) from another device. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone (not shown), or may be digitized by a voice recognition device. As shown, device 1400 may include color cameras 1421, 1422, and a flash 1410 integrated into back 1402 (or elsewhere) of device 1400. In other examples, color cameras 1421, 1422, and flash 1410 may be integrated into front 1401 of device 1400 or both front and back sets of cameras may be provided. Color cameras 1421, 1422 and a flash 1410 may be components of a camera module to originate color image data with IR texture correction that may be processed into an image or streaming video that is output to display 1404 and/or communicated remotely from device 1400 via antenna 1408 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method comprises decoding a received bitstream to generate a first video picture of a decoded video stream, wherein the first video picture comprises a first resolution, applying a pretrained decompression upsampling portion of a generative adversarial network to the first video picture to upsample and improve the perceptual quality of the first video picture to generate a second video picture, wherein the second video picture comprises a second resolution greater than the first resolution, and outputting the second picture.

In one or more second embodiments, further to the first embodiments, the decoded video stream comprises a first video stream of a plurality of contemporaneous video streams attained from a corresponding plurality of cameras trained on a scene.

In one or more third embodiments, further to the first or second embodiments, the method further comprises downsampling each of the contemporaneous video streams, encoding each of the downsampled contemporaneous video streams to generate a corresponding plurality of bitstreams comprising the received bitstream, and transmitting each of the plurality of bitstreams In one or more fourth embodiments, further to the first through third embodiments, the second resolution is not less than eight times the first resolution in both the vertical and horizontal directions.

In one or more fifth embodiments, further to the first through fourth embodiments, the pretrained decompression upsampling portion comprises a plurality of first residue blocks followed by a plurality of upsample blocks followed by at least one second residue block.

In one or more sixth embodiments, further to the first through fifth embodiments, each of the first and second residue blocks comprises a convolutional layer, a rectified linear unit layer, and a summing layer and each upsample block comprises a transposed convolutional layer and a rectified linear unit layer, and wherein the at least one second residue block is followed by a convolutional layer.

In one or more seventh embodiments, further to the first through sixth embodiments, the method further comprises downsampling a training picture received at the second resolution to the first resolution, encoding the downsampled training picture to generate a second bitstream, decoding the second bitstream to generate a decoded training picture, applying a decompression upsampling portion of the generative adversarial network to the decoded training picture to generate a resultant picture at the second resolution, determining a content loss using the training picture and the resultant picture, applying a discrimination network to the resultant picture to generate an evaluation as to whether the resultant picture is real or fake, determining a discriminator loss based on the evaluation, and training the decompression upsampling portion of the generative adversarial network using a final loss based on both the content loss and the discriminator loss.

In one or more eighth embodiments, further to the first through seventh embodiments, the method further comprises receiving a first region indicator corresponding to a first region of the first video picture and a second region indicator corresponding to a second region of the first video picture, wherein the pretrained decompression upsampling portion is applied only to the first region in response to the first region indicator and the pretrained decompression upsampling portion is not applied to the second region in response to the background region indicator.

In one or more ninth embodiments, further to the first through eighth embodiments, the method further comprises receiving a first region indicator corresponding to a first region of the first video picture and a second region indicator corresponding to a second region of the first video picture, wherein the pretrained decompression upsampling portion is applied only to the first region in response to the first region indicator and applying a second pretrained decompression upsampling portion of a second generative adversarial network to the second region to upsample and apply texture to the second region in response to the second region indicator.

In one or more tenth embodiments, further to the first through ninth embodiments, a first bitrate of the first region is greater than a second bitrate of the second region in response to the first region being a region of interest.

In one or more eleventh embodiments, a device or system includes a memory and a processor to perform a method according to any one of the above embodiments.

In one or more twelfth embodiments, at least one machine readable medium includes a plurality of instructions that in response to being executed on a computing device, cause the computing device to perform a method according to any one of the above embodiments.

In one or more thirteenth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An apparatus comprising:
  a memory to store at least a portion of a received bitstream; and
  one or more processors coupled to the memory, the one or more processors to:
    decode the received bitstream to generate a first video picture of a decoded video stream, wherein the first video picture comprises a first resolution;
    apply a pretrained decompression upsampling portion of a generative adversarial network to the first video picture to upsample and improve the perceptual quality of the first video picture to generate a second video picture, wherein the second video picture comprises a second resolution greater than the first resolution, and wherein the pretrained decompression upsampling portion comprises a plurality of first residue blocks followed by a plurality of upsample blocks followed by at least one second residue block; and
    output the second picture.

2. The apparatus of claim 1, wherein the decoded video stream comprises a first video stream of a plurality of contemporaneous video streams attained from a corresponding plurality of cameras trained on a scene.

3. The apparatus of claim 1, wherein each of the first and second residue blocks comprises a convolutional layer, a rectified linear unit layer, and a summing layer and each upsample block comprises a transposed convolutional layer and a rectified linear unit layer, and wherein the at least one second residue block is followed by a convolutional layer.

4. The apparatus of claim 1, the one or more processors further to:
receive a first region indicator corresponding to a first region of the first video picture and a second region indicator corresponding to a second region of the first video picture, wherein the pretrained decompression upsampling portion is applied only to the first region in response to the first region indicator and the pretrained decompression upsampling portion is not applied to the second region in response to the second region indicator.

5. The apparatus of claim 1, the one or more processors further to:
receive a first region indicator corresponding to a first region of the first video picture and a second region indicator corresponding to a second region of the first video picture, wherein the pretrained decompression upsampling portion is applied only to the first region in response to the first region indicator; and
apply a second pretrained decompression upsampling portion of a second generative adversarial network to the second region to upsample and apply texture to the second region in response to the second region indicator.

6. At least one non-transitory machine readable medium comprising a plurality of instructions that, in response to being executed on a computing device, cause the computing device to:
decode a received bitstream to generate a first video picture of a decoded video stream, wherein the first video picture comprises a first resolution;
apply a pretrained decompression upsampling portion of a generative adversarial network to the first video picture to upsample and improve the perceptual quality of the first video picture to generate a second video picture, wherein the second video picture comprises a second resolution greater than the first resolution, and wherein the pretrained decompression upsampling portion comprises a plurality of first residue blocks followed by a plurality of upsample blocks followed by at least one second residue block; and
output the second picture.

7. The non-transitory machine readable medium of claim 6, wherein a ratio of a bitrate of the received bitstream to the first resolution is not more than two bits per second per pixel.

8. The non-transitory machine readable medium of claim 6, wherein the decoded video stream comprises a first video stream of a plurality of contemporaneous video streams attained from a corresponding plurality of cameras trained on a scene.

9. The non-transitory machine readable medium of claim 6, wherein each of the first and second residue blocks comprises a convolutional layer, a rectified linear unit layer, and a summing layer and each upsample block comprises a transposed convolutional layer and a rectified linear unit layer, and wherein the at least one second residue block is followed by a convolutional layer.

10. The non-transitory machine readable medium of claim 6, further comprising a plurality of instructions that, in response to being executed on the computing device, cause the computing device to:
receive a first region indicator corresponding to a first region of the first video picture and a second region indicator corresponding to a second region of the first video picture, wherein the pretrained decompression upsampling portion is applied only to the first region in response to the first region indicator and the pretrained decompression upsampling portion is not applied to the second region in response to the second region indicator.

11. The non-transitory machine readable medium of claim 6, further comprising a plurality of instructions that, in response to being executed on the computing device, cause the computing device to:
receive a first region indicator corresponding to a first region of the first video picture and a second region indicator corresponding to a second region of the first video picture, wherein the pretrained decompression upsampling portion is applied only to the first region in response to the first region indicator; and
apply a second pretrained decompression upsampling portion of a second generative adversarial network to the second region to upsample and apply texture to the second region in response to the second region indicator.

12. An apparatus comprising: a memory to store at least a portion of a received bitstream; and one or more processors coupled to the memory, the one or more processors to: decode the received bitstream to generate a first video picture of a decoded video stream, wherein the first video picture comprises a first resolution; receive a first region indicator corresponding to a first region of the first video picture and a second region indicator corresponding to a second region of the first video picture;
apply a pretrained decompression upsampling portion of a generative adversarial network to the first video picture to upsample and to improve the perceptual quality of the first video picture to generate a second video picture, wherein the second video picture comprises a second resolution greater than the first resolution, and wherein the pretrained decompression upsampling portion is applied only to the first region in response to the first region indicator and the pretrained decompression upsampling portion is not applied to the second region in response to the second region indicator; and output the second picture.

13. The apparatus of claim 12, the one or more processors to:
apply a second pretrained decompression upsampling portion of a second generative adversarial network to the second region to upsample and apply texture to the second region in response to the second region indicator.

14. The apparatus of claim 13, wherein a first bitrate of the first region is greater than a second bitrate of the second region in response to the first region being a region of interest.

15. The apparatus of claim 12, wherein the first region indicator is a foreground region indicator and the second region indicator is a background region indicator.

16. The apparatus of claim 12, wherein the decoded video stream comprises a first video stream of a plurality of contemporaneous video streams attained from a corresponding plurality of cameras trained on a scene.

17. At least one non-transitory machine readable medium comprising a plurality of instructions that, in response to being executed on a computing device, cause the computing device to: decode a received bitstream to generate a first video picture of a decoded video stream, wherein the first video picture comprises a first resolution; receive a first region indicator corresponding to a first region of the first video picture and a second region indicator corresponding to a second region of the first video picture;

apply a pretrained decompression upsampling portion of a generative adversarial network to the first video picture to upsample and to improve the perceptual quality of the first video picture to generate a second video picture, wherein the second video picture comprises a second resolution greater than the first resolution, and wherein the pretrained decompression upsampling portion is applied only to the first region in response to the first region indicator and the pretrained decompression upsampling portion is not applied to the second region in response to the second region indicator; and output the second picture.

18. The non-transitory machine readable medium of claim 17, further comprising a plurality of instructions that, in response to being executed on the computing device, cause the computing device to:

apply a second pretrained decompression upsampling portion of a second generative adversarial network to the second region to upsample and apply texture to the second region in response to the second region indicator.

19. The non-transitory machine readable medium of claim 18, wherein a first bitrate of the first region is greater than a second bitrate of the second region in response to the first region being a region of interest.

20. The non-transitory machine readable medium of claim 17, wherein the first region indicator is a foreground region indicator and the second region indicator is a background region indicator.

21. The non-transitory machine readable medium of claim 17, wherein the decoded video stream comprises a first video stream of a plurality of contemporaneous video streams attained from a corresponding plurality of cameras trained on a scene.

* * * * *